(12) United States Patent
Aoyagi (10) Patent No.: US 8,787,955 B2
(45) Date of Patent: Jul. 22, 2014

(54) NETWORK DEVICE AND RADIO BASE STATION

(75) Inventor: Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 336 days.

(21) Appl. No.: 12/990,707

(22) PCT Filed: May 1, 2009

(86) PCT No.: PCT/JP2009/058584
§ 371 (c)(1),
(2), (4) Date: Jan. 12, 2011

(87) PCT Pub. No.: WO2009/133952
PCT Pub. Date: Nov. 5, 2009

(65) Prior Publication Data
US 2011/0111782 A1    May 12, 2011

(30) Foreign Application Priority Data

May 2, 2008    (JP) .................................. 2008-120310

(51) Int. Cl.
*H04B 7/00*    (2006.01)
(52) U.S. Cl.
USPC ........................................................ 455/508
(58) Field of Classification Search
USPC .................. 455/436–455, 8, 560–561, 574
See application file for complete search history.

(56) References Cited

U.S. PATENT DOCUMENTS

| | | | | |
|---|---|---|---|---|
| 5,937,353 A | * | 8/1999 | Fapojuwo | 455/444 |
| 5,999,819 A | * | 12/1999 | Khanna et al. | 455/450 |
| 6,360,106 B1 | * | 3/2002 | Besson | 455/561 |
| 7,873,319 B2 | * | 1/2011 | Lastinger et al. | 455/63.1 |
| 2009/0111381 A1 | * | 4/2009 | Johnson et al. | 455/63.4 |
| 2010/0159960 A1 | * | 6/2010 | Chou et al. | 455/458 |

FOREIGN PATENT DOCUMENTS

| | | |
|---|---|---|
| CN | 1240095 A | 11/1999 |
| JP | 7 170566 | 7/1995 |
| JP | 9 65422 | 3/1997 |
| JP | 2002 204478 | 7/2002 |
| JP | 2005 354549 | 12/2005 |
| JP | 2007 228213 | 9/2007 |

OTHER PUBLICATIONS

International Search Report issued Jul. 21, 2009 in PCT/JP09/058584 filed May 1, 2009.
Office Action issued on Jan. 30, 2013, in Chinese Patent Application No. 200980115892.7 with English translation.
Japanese Office Action issued on May 14, 2013 in the counterpart Japanese Patent application 2010-510176, with English translation.
Chinese Office Action issued Oct. 10, 2013, in corresponding Chinese Patent Application 200980115892.7 with an English translation.

* cited by examiner

*Primary Examiner* — Nay A Maung
*Assistant Examiner* — Maryam Soltanzadeh
(74) *Attorney, Agent, or Firm* — Oblon, Spivak, McClelland, Maier & Neustadt, L.L.P.

(57) ABSTRACT

A network device 10 according to the present invention includes a management unit 11 configured to manage a cell-to-be-monitored and a cell-to-be-controlled in association with each other, and an instruction unit 13 configured to give a predetermined instruction to a radio base station which manages the cell-to-be-controlled in association with the cell-to-be-monitored, upon detection of a predetermined trigger in the cell-to-be-monitored.

5 Claims, 7 Drawing Sheets

| CELL-TO-BE-MONITORED | CELL-TO-BE-CONTROLLED | TRIGGER | INSTRUCTION CONTENT |
|---|---|---|---|
| #a | #c | NUMBER OF PRESENCE ≧ 1 IN CELL | ACTIVATION |
| #a | #c | NUMBER OF PRESENCE = 0 IN CELL | DEACTIVATION |

NETWORK DEVICE AND RADIO BASE STATION

TECHNICAL FIELD

The present invention relates to a network device and a radio base station.

BACKGROUND ART

A mobile communication operator makes a plan to establish a service area based on thorough examination results such as a radio wave measurement result and a traffic condition observation result, and carries out installation of a radio base station, adjustment of an antenna angle of a radio base station and the like based on the establishment plan.

Considering that mobile stations using communication services can be always present, even temporarily, in a service area, a radio base station keeps at all times transmitting radio waves even in a case where no mobile station is present at some point in time. This results in wasted power consumption.

For example, in some cases, a particular location such as a maritime route, a ski resort, a railroad tunnel or a mountainous region may not require a communication service to be provided during a particular time or season. However, there is a need to perform cell design over a wide range so that all possible communications in a service area can be covered. Thus, such redundant power and operation, etc. are required.

Meanwhile, in a particular location such as a ski resort, a tourist spot or a mountainous region, the number of mobile stations present therein or communication traffic volume is expected to vary between day and night or depending on the season, and there may possibly be a period for which no mobile stations are present.

A mobile communication operator can change a service area, as needed, based on an observation result on usage by mobile stations and the like.

Moreover, in the case where there is installed a micro base station that can be installed anywhere at the initiative of a user, such as a femto cell radio base station, the femto cell radio base station can be caused to observe the status of a surrounding macro cell, and can change a service area according to the status of the surrounding macro cell by activating or deactivating itself, adjusting an antenna angle or the like.

SUMMARY OF THE INVENTION

Problems to be Solved by the Invention

However, a conventional mobile communication system does not have change means for instantaneously setting an area once regarded as outside the service area back to a service area. This produces a problem that it is difficult to temporarily set an area in which traffic does not normally occur to serve as a service area at the time of an unexpected incident or emergency such as occurrence of a disaster.

Moreover, the conventional mobile communication system does not allow communication service provision in the femto cell to be instantaneously stopped or restarted, for example, at the initiative of a mobile communication operator even in a case such as the case where radio waves transmitted by the femto cell radio base station act as interference waves and greatly affect the general communication service area during communication traffic congestion and the like in a general communication service area, or the case of transmitting emergency broadcast information (CBS). This is an obstacle to installation of the femto cell radio base station within public radio.

The present invention has been made in view of the foregoing problems. It is an object of the present invention to provide a network device and a radio base station, which are capable of dynamically changing whether or not to provide a communication service in a specific area.

Means for Solving the Problems

The first feature of the present invention is summarized in that a network device including a management unit configured to manage a cell-to-be-monitored and a cell-to-be-controlled in association with each other, and an instruction unit configured to give a predetermined instruction to a radio base station which manages the cell-to-be-controlled in association with the cell-to-be-monitored, upon detection of a predetermined trigger in the cell-to-be-monitored.

In the first feature of the present invention, the instruction unit may determine that the predetermined trigger is detected in the cell-to-be-monitored when the number of mobile stations on standby or in process of establishing a radio connection in the cell-to-be-monitored exceeds a predetermined number, and instructs the radio base station which manages the cell-to-be-controlled in association with the cell-to-be-monitored to make the cell-to-be-controlled usable.

In the first feature of the present invention, the instruction unit may determine that a predetermined trigger is detected in the cell-to-be-monitored when the number of mobile stations on standby or in process of establishing a radio connection in the cell-to-be-monitored falls below a predetermined number, and instructs the radio base station which manages the cell-to-be-controlled in association with the cell-to-be-monitored to make the cell-to-be-controlled unusable.

In the first feature of the present invention, an area covered by the cell-to-be-monitored may not geographically overlap with an area covered by the cell-to-be-controlled.

In the first feature of the present invention, a communication method or a frequency band used in the cell-to-be-monitored may be different from a communication method or a frequency band used in the cell-to-be-controlled.

The second feature of the present invention is summarized in that a radio base station including a management unit configured to manage a cell-to-be-monitored and a cell-to-be-controlled in association with each other, and a controller configured to perform predetermined control on the cell-to-be-controlled which is managed in association with the cell-to-be-monitored, upon detection of a predetermined trigger in the cell-to-be-monitored.

In the second feature of the present invention, the controller may determine that the predetermined trigger is detected in the cell-to-be-monitored when the number of mobile stations on standby or in process of establishing a radio connection in the cell-to-be-monitored exceeds a predetermined number, and performs control to make usable the cell-to-be-controlled managed in association with the cell-to-be-monitored.

In the second feature of the present invention, the controller may determine that the predetermined trigger is detected in the cell-to-be-monitored when the number of mobile stations on standby or in process of establishing a radio connection in the cell-to-be-monitored falls below a predetermined number, and performs control to make unusable the cell-to-be-controlled managed in association with the cell-to-be-monitored.

In the second feature of the present invention, an area covered by the cell-to-be-monitored may not geographically overlap with an area covered by the cell-to-be-controlled.

In the second feature of the present invention, a communication method or a frequency band used in the cell-to-be-monitored may be different from a communication method or a frequency band used in the cell-to-be-controlled.

Effects of the Invention

As described above, the present invention can provide a network device and a radio base station, which are capable of dynamically changing whether or not to provide a communication service in a specific area.

MODES FOR CARRYING OUT THE INVENTION

Figure 1:
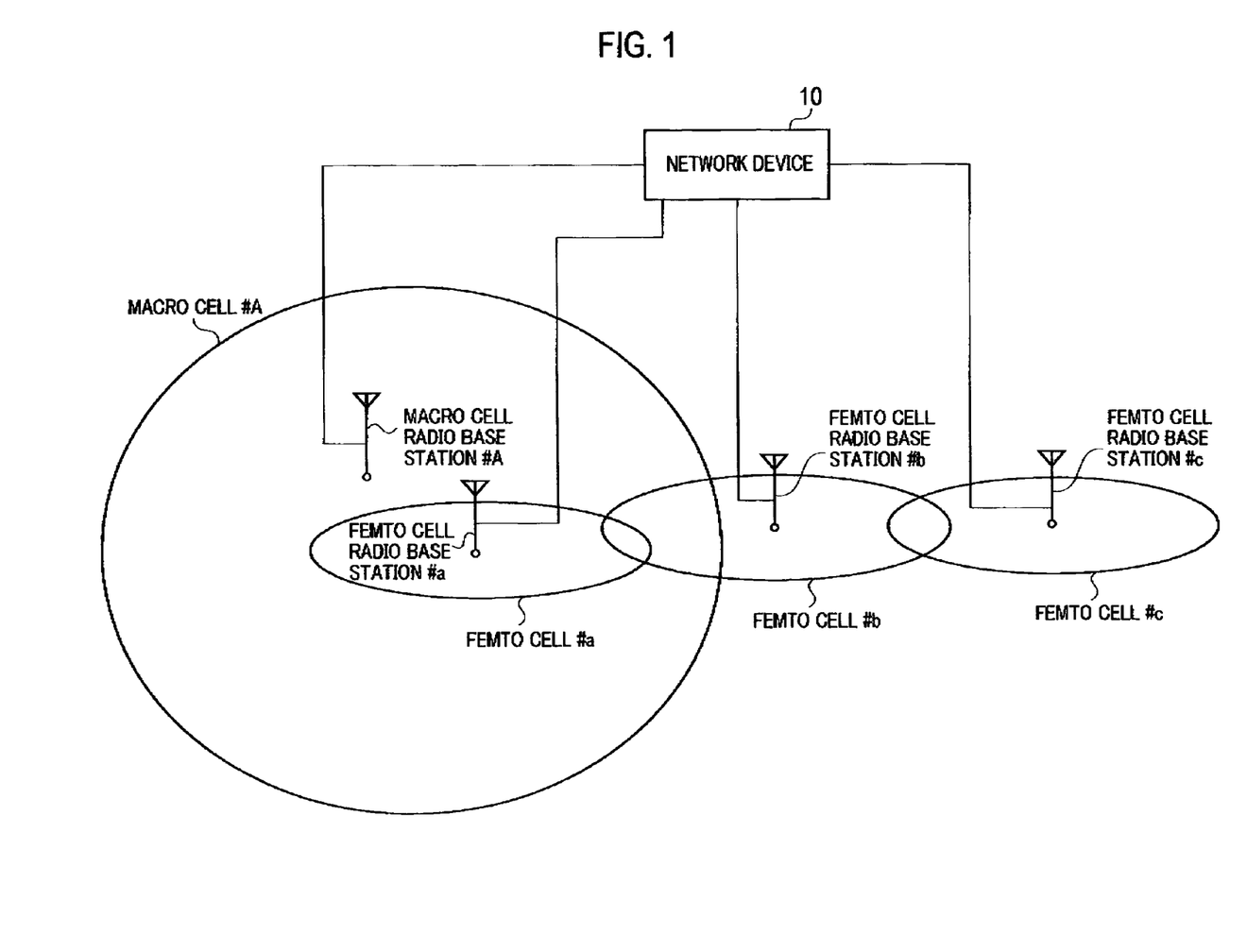
FIG. 1 is an overall configuration diagram of a mobile communication system according to a first embodiment of the present invention.
Figure 2:
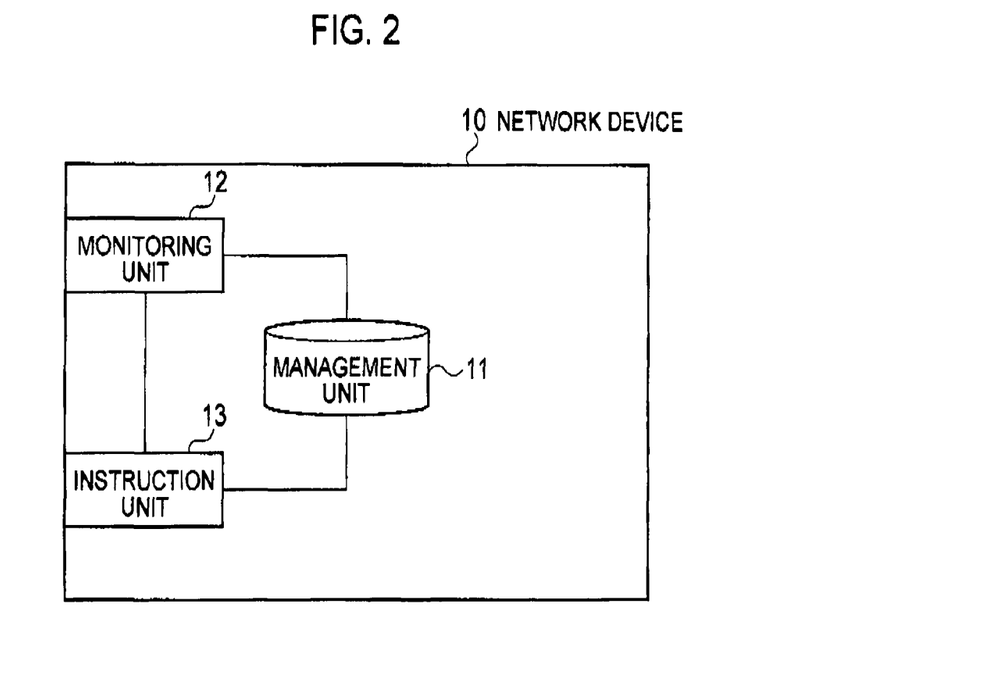
FIG. 2 is a functional block diagram of a network device according to the first embodiment of the present invention.
Figure 3:
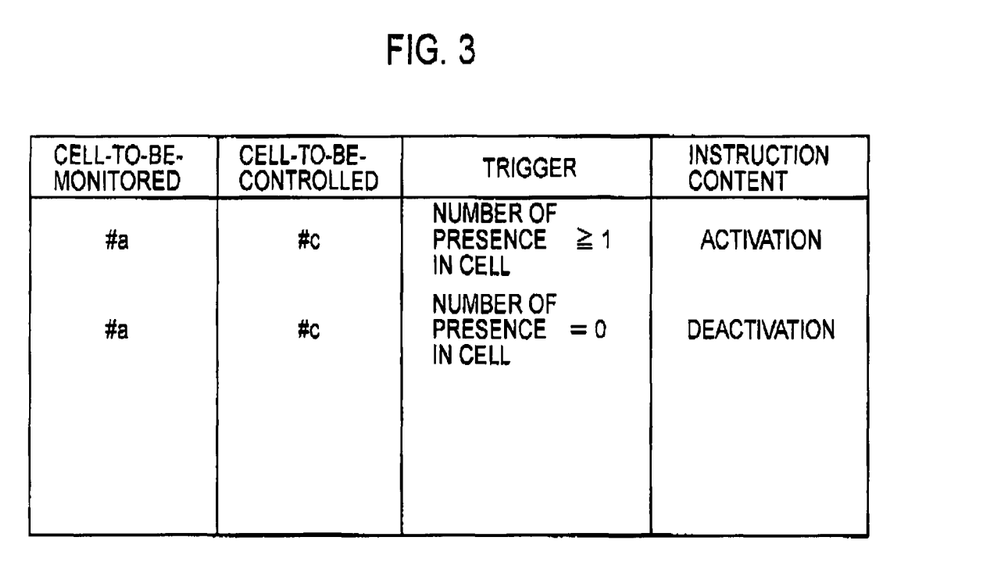
FIG. 3 is a diagram showing an example of contents managed by a management unit in the network device according to the first embodiment of the present invention.

Configuration of Mobile Communication System According to First Embodiment of the Invention With reference to FIGS. 1 to 3, a configuration of a mobile communication system according to a first embodiment of the present invention is described.

The mobile communication system according to the first embodiment of the present invention may be a W-CDMA mobile communication system or may be an LTE (Long Term Evolution) mobile communication system.

As shown in FIG. 1, the mobile communication system according to this embodiment includes: a network device 10 including an exchange MME/MSC/SGSN, a position registration server, a radio controller RNC or the like; a macro cell radio base station #A; and femto cell radio base stations #a to #c.

As shown in FIG. 1, an area covered by a femto cell #a geographically overlaps with an area covered by a macro cell #A, and a part of an area covered by a femto cell #b geographically overlaps with the area covered by the macro cell #A.

Meanwhile, an area covered by a femto cell #c does not geographically overlap with the area covered by the macro cell #A and the area covered by the femto cell #a.

A communication method or a frequency band used in the femto cell #c may be different from that used in the area covered by the macro cell #A and the femto cell #a.

As shown in FIG. 2, the network device 10 includes a management unit 11, a monitoring unit 12 and an instruction unit 13.

The management unit 11 is configured to manage a cell-to-be-monitored and a cell-to-be-controlled in association with each other.

For example, as shown in FIG. 3, the management unit 11 is configured to manage a table associating "cell-to-be-monitored", "cell-to-be-controlled", "trigger" and "instruction content" with each other.

Note that the management unit 11 may set a single cell or multiple cells as the "cell-to-be-monitored" or the "cell-to-be-controlled".

The monitoring unit 12 is configured to monitor occurrence of a trigger (predetermined trigger) set in "trigger" in a cell (cell-to-be-monitored) set in "cell-to-be-monitored".

For example, the monitoring unit 12 is configured to detect that the number of mobile stations on standby or in process of establishing a radio connection in the cell-to-be-monitored has exceeded a predetermined value or dropped below the predetermined value.

The monitoring unit 12 may be configured to detect that scheduling information or CBS data has been transmitted in the cell-to-be-monitored.

The instruction unit 13 is configured to give an instruction (predetermined instruction) set in "instruction content" to a radio base station which manages a cell (cell-to-be-controlled) set in "cell-to-be-controlled" upon detection of a trigger (predetermined trigger) set in "trigger" in a cell (cell-to-be-monitored) set in "cell-to-be-monitored".

In the example shown in FIG. 3, the instruction unit 13 instructs the femto cell radio base station #c that manages the femto cell #c set in "cell-to-be-controlled" to activate the femto cell #c, i.e., to make the femto cell #c usable upon detecting that the number of mobile stations on standby has reached 1 or more (predetermined trigger) in the femto cell #a set in "cell-to-be-monitored".

In addition, the instruction unit 13 instructs the femto cell radio base station #c that manages the femto cell #c set in "cell-to-be-controlled" to deactivate the femto cell #c, i.e., to make the femto cell #c unusable upon detecting that the number of mobile stations on standby has reached 0 (predetermined trigger) in the femto cell #a set in "cell-to-be-monitored".

Additionally, the instruction unit 13 may instruct the femto cell radio base station #c that manages the femto cell #c set in "cell-to-be-controlled" to activate the femto cell #c, i.e., to make the femto cell #c usable upon detecting that the number of mobile stations in process of establishing a radio connection has reached 1 or more (predetermined trigger) in the femto cell #a set in "cell-to-be-monitored".

Moreover, the instruction unit 13 may instruct the femto cell radio base station #c that manages the femto cell #c set in "cell-to-be-controlled" to deactivate the femto cell #c, i.e., to make the femto cell #c unusable upon detecting that the number of mobile stations in process of establishing a radio connection has reached 0 (predetermined trigger) in the femto cell #a set in "cell-to-be-monitored".

The macro cell radio base station #A and the femto cell radio base stations #a to #c can change a service area to be covered, in response to an operation performed by the mobile communication operator (more specifically, an instruction from the instruction unit 13 in the network device 10).

For example, the macro cell radio base station #A and the femto cell radio base stations #a to #c can make a specific cell usable or unusable, i.e., can activate or deactivate the specific cell in response to an instruction from the instruction unit 13 in the network device 10.

Further, the macro cell radio base station #A and the femto cell radio base stations #a to #c can change the size of the area that can be covered by the cells under the control thereof, in response to an instruction from the instruction unit 13 in the network device 10.

FIG. 1 shows a configuration in which the femto cell radio base station #c (a radio base station in a mobile communication system #2) manages, in a complementary manner, the area covered by the femto cell #c in a state where the macro cell radio base station #A (a radio base station in a mobile communication system #1) manages only the area covered by the macro cell #A. In this configuration, when a mobile station X that can communicate with both the macro cell radio base station #A and the femto cell radio base station #c is present in the area covered by the femto cell #c, information to the effect that the mobile station X is present in that area is notified to the macro cell radio base station #A, thereby making it possible to determine that the area covered by the femto cell #c needs to be managed.

In the above case, the instruction unit 13 in the network device 10 can instruct the macro cell radio base station #A to change an antenna directional angle or to activate the cell covering the area so that the area covered by the femto cell #c is covered.

The instruction unit 13 in the network device 10 can also instruct the macro cell radio base station ∩A to change the antenna directional angle or to deactivate the cell covering the area when observing that no mobile station UE is present in the area covered by the femto cell #c.

Note that, when the mobile communication system according to the first embodiment of the present invention is the LTE (Long Term Evolution) mobile communication system, the functions of the radio base station NodeB described above and functions of the radio controller RNC are installed in the radio base station eNB or the exchange MME.

(Operations of Mobile Communication System According to First Embodiment of the Invention)

Figure 4:
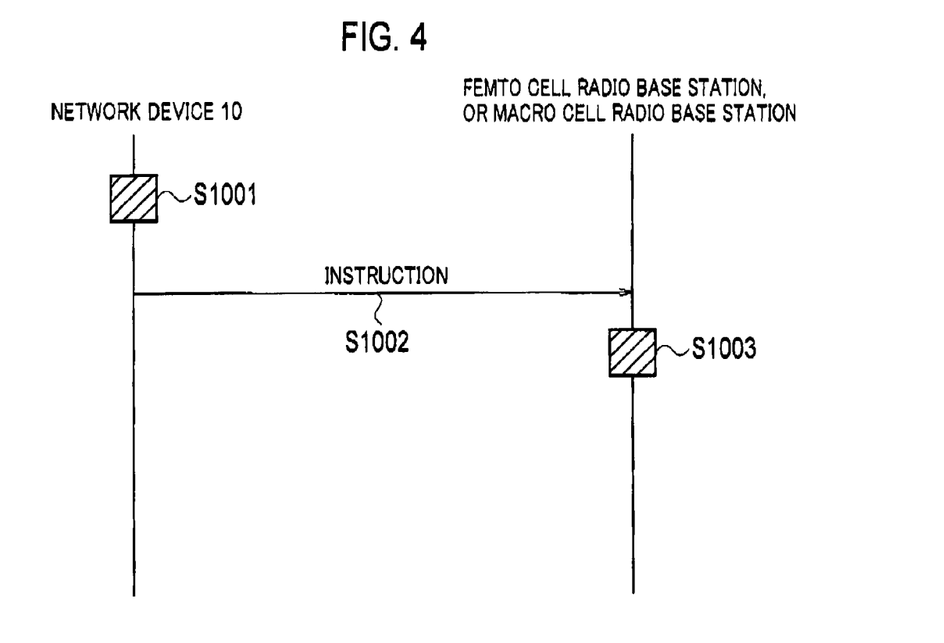
FIG. 4 is a sequence diagram showing operations of the mobile communication system according to the first embodiment of the present invention.

With reference to FIG. 4, operations of the mobile communication system according to the first embodiment of the present invention are described.

As shown in FIG. 4, in Step S1001, the network device 10 monitors a traffic condition (the number of mobile stations on standby or in process of establishing a radio connection) in the cell-to-be-monitored, an area covered by a cell managed by each radio base station (out-of-range information), an emergency disaster report and the like.

Note that the network device 10 can also collect other information required to dynamically change a service area, such as the state of a mobile station present in an area in which no communication service is provided, railroad schedule of trains, and traffic variations depending on time of year or time of day.

The network device 10 also determines whether or not to change the service area based on the result of monitoring, the collected information and the like.

When determining that the service area should be changed based on the result of monitoring, the collected information and the like, the network device 10 instructs, in Step S1002, the radio base station (any of the femto cell radio base stations or the macro cell radio base station) that manages the cell-to-be-controlled to activate or deactivate the cell-to-be-controlled, to change the antenna directional angle or various set values, etc.

In Step S1003, the radio base station that manages the cell-to-be-controlled activates or deactivates the cell-to-be-controlled, and changes the antenna directional angle or various set values, in response to an instruction from the network device 10.

(Advantageous Effects of Mobile Communication System According to First Embodiment of the Invention)

The mobile communication system according to the first embodiment of the present invention can predict a communication situation in the cell-to-be-controlled from a traffic condition of a peripheral cell, and activate or deactivate the cell-to-be-controlled and change the antenna directional angle or various set values.

For example, when the number of mobile stations present in the peripheral cell (the number of mobile stations on standby) falls below a predetermined threshold based on information on the presence of mobile stations in the peripheral cell, communication service provision in the cell can be stopped. On the other hand, when the number of mobile stations present in the peripheral cell (the number of mobile stations on standby) exceeds the predetermined threshold based on the information on the presence of mobile stations in the peripheral cell, communication service provision in the cell can be started. Such control enables an area that does not need to be provided with any communication service to be always regarded as outside the communication service range or, as needed, within the communication service range.

Moreover, during the time when no communication service needs to be provided in the cell-to-be-controlled, based on the traffic condition and the presence of mobile stations in the cell, the radio base station suspends transmission of radio waves in the cell.

Further, when the network device 10 collects out-of-range information or location information from the mobile stations, control of resuming the communication in the cell related to the out-of-range information or location information can be performed, thus expecting to achieve an effect of reducing power consumption by suppressing transmission power.

The information acquired by the network device 10 may be constantly observable information such as the number of mobile stations in process of establishing a radio connection (in communication with the radio base station).

For example, when several cells using different frequencies are prepared, which cover a specific area, and when a traffic condition observation result is obtained, indicating that there are few mobile stations in communication with the radio base station in the cell-to-be-controlled, deactivation or activation of the cell-to-be-controlled can be performed instantaneously.

The mobile communication system according to the first embodiment of the present invention can perform an efficient and instantaneous operation where a communication service is provided if necessary and is not provided if not necessary, for example, in an area that does not require constant provision of a communication service, such as a ski resort.

Moreover, collection of a show schedule at a movie theater, etc. or a railroad schedule of trains by the network device 10 makes it possible to realize a dynamic change of service area, such as regarding the area as outside the communication service range or within the communication service range, without providing the radio base station with a new function.

The mobile communication system according to the first embodiment of the present invention further enables an operation where a micro base station such as a femto cell radio base station is disposed in a train and the femto cell radio base station is activated only in a tunnel, thus making it possible to expect reduction in operations of cell design in the mobile communication system and the effect of reduction in power consumption of the radio base station.

Also conceivable is control of tracking the service area keeping up with the movement of a train or the like by using a highly directional antenna, thus making it possible to expect the effect of improvement in communication quality or the effect of reduction in power consumption by reducing cell switch procedures in a mobile terminal.

In the case of installing a radio base station that the user can install at his/her will, such as a femto cell radio base station, control of stopping the radio base station in consideration of the influence of interference can also be performed when the traffic is increased in response to the control of activation and deactivation of the radio base station based on the traffic condition observed by the network device 10, for example.

Figure 5:
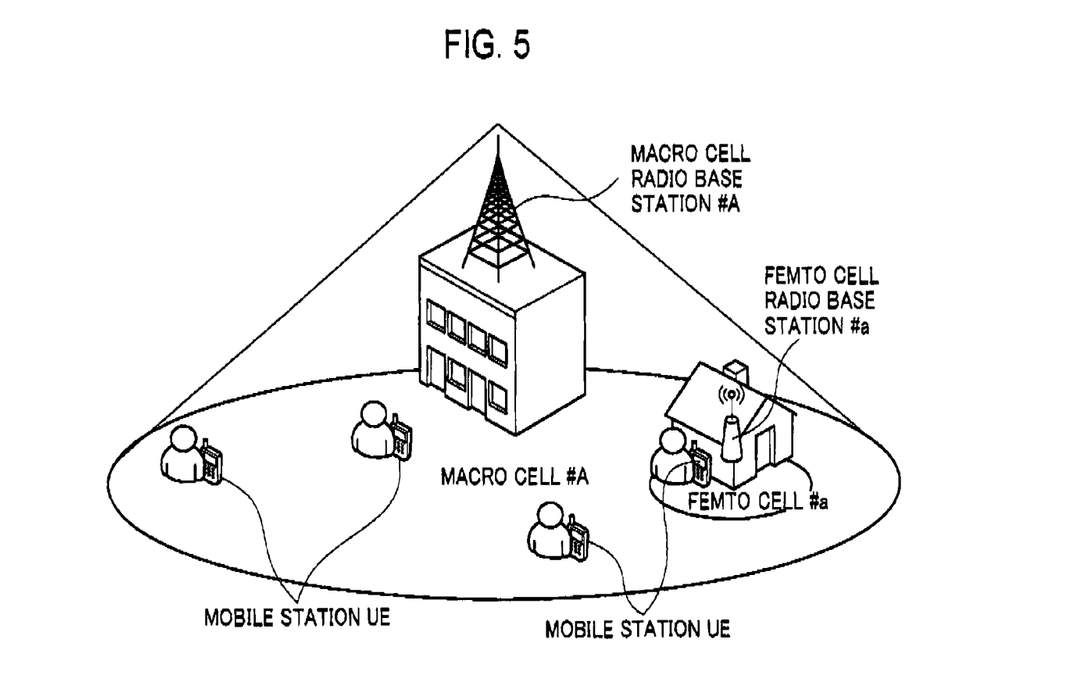
FIG. 5 is a diagram for explaining an instruction given by an instruction unit in the network device according to the first embodiment of the present invention.

In a configuration shown in FIG. 5, the influence of interference waves attributable to radio communication using a home cell #a is considered to be small since there are few mobile stations present in the macro cell #A. On the other hand, in a configuration shown in FIG. 6, the possibility of being affected by interference waves attributable to radio communication using the home cell #a is considered to be high since there are a considerable number of mobile stations present in the macro cell #A.

Figure 6:
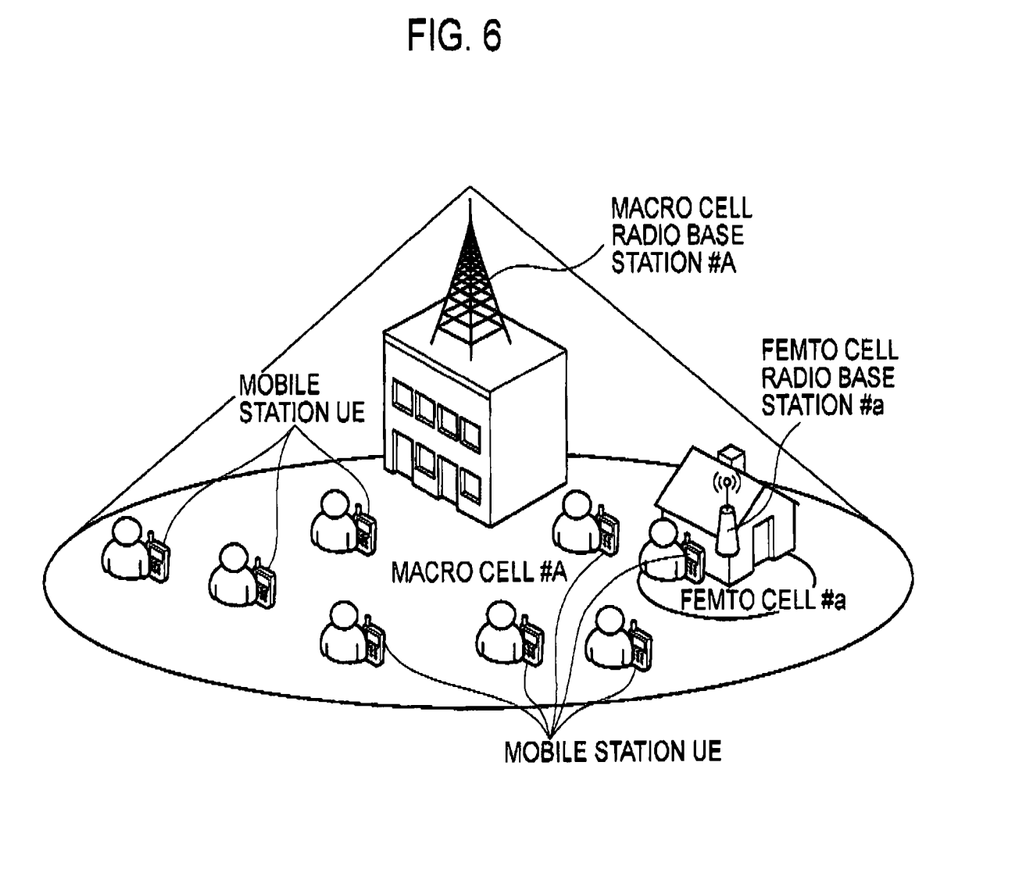
FIG. 6 is a diagram for explaining an instruction given by the instruction unit in the network device according to the first embodiment of the present invention.

The network device 10 can increase the priority of highly public mobile communication service using the macro cell #A by including a function to deactivate the home cell #a when the number of mobile stations present in the macro cell #A or the number of mobile stations in communication with the radio base station exceeds the predetermined threshold as described above or in case of an emergency such as a disaster.

Figure 7:
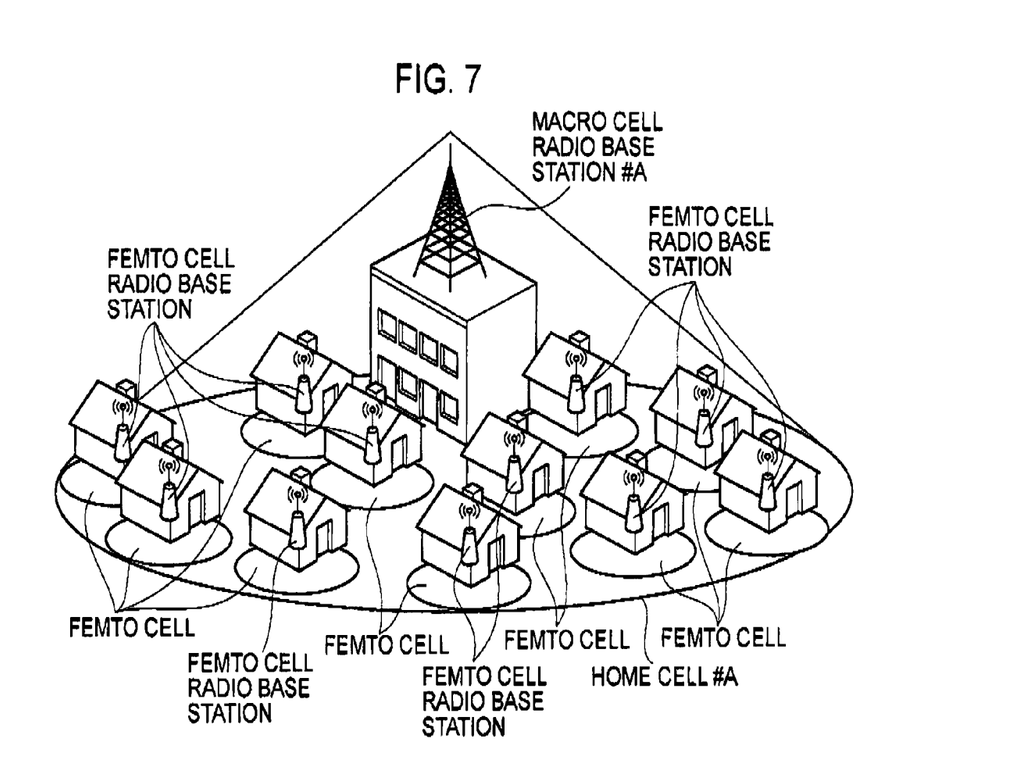
FIG. 7 is a diagram for explaining an instruction given by the instruction unit in the network device according to the first embodiment of the present invention.

Further, as shown in FIG. 7, in an apartment, residential areas and the like where home cells are disposed everywhere in the macro cell #A, the network device 10 determines that the home cells can be sufficiently used as a substitute for the macro cell #A when observing that there is no mobile station present in the macro cell #A, thus making it possible to expect the effect of power saving by deactivation of the macro cell or the like.

The mobile communication system according to the first embodiment of the present invention includes a method for determining whether a certain area is within or outside the communication service range by using information such as constantly observed traffic conditions. The inclusion of such a method enables a dynamic change of service area by control of the radio base station at the initiative of a mobile communication operator, and also enables an instantaneous provision of a service area in case of an unexpected incident or emergency or when there are mobile stations present in the cell, by deactivating the radio base station to reduce power consumption when there is no mobile station present in the cell on a normal basis.

The conventional technology can temporarily provide a communication service by making arrangement such as installing an in-vehicle radio base station in the case where the traffic is concentrated in an event like a fireworks show, for example, but has difficulty in instantaneously coping with an unexpected incident, emergency and the like.

Further, the mobile communication system according to the first embodiment of the present invention can carry out cell design which prioritizes provision of highly public communication service by controlling activation and deactivation of the radio base station, changing of antenna angle and the like at the initiative of the mobile communication operator using information acquired by the mobile communication operator, such as traffic conditions in a peripheral radio base station, and information observed by the network, such as public information.

(Mobile Communication System According to Second Embodiment of the Invention)

Figure 8:
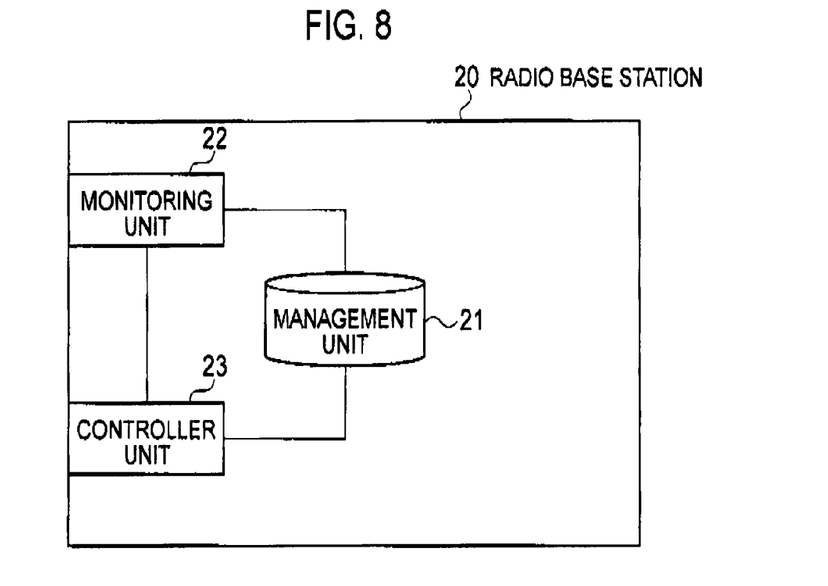
FIG. 8 is a functional block diagram of a radio base station according to a second embodiment of the present invention.

With reference to FIG. 8, a mobile communication system according to a second embodiment of the present invention is described. The description of the mobile communication system according to the second embodiment of the present invention is given below by focusing on differences from the mobile communication system according to the first embodiment of the present invention.

As shown in FIG. 8, the network device 20 includes a management unit 21, a monitoring unit 22 and a controller 23.

The management unit 21 is configured to manage a cell-to-be-monitored and a cell-to-be-controlled in association with each other, in the same manner as the management unit 11 of the above-mentioned network device 10.

For example, as shown in FIG. 3, the management unit 21 is configured to manage a table associating "cell-to-be-monitored", "cell-to-be-controlled", "trigger" and "instruction content" with each other.

The monitoring unit 22 is configured to monitor occurrence of a trigger (predetermined trigger) set in "trigger" in a cell (cell-to-be-monitored) set in "cell-to-be-monitored".

For example, the monitoring unit 22 is configured to detect that the number of mobile stations on standby or in process of establishing a radio connection in the cell-to-be-monitored has exceeded a predetermined value or dropped below the predetermined value.

The controller 23 is configured to perform control (predetermined control) corresponding to an instruction (predetermined instruction) set in "instruction content" to a radio base station which manages a cell (cell-to-be-controlled) set in "cell-to-be-controlled" upon detection of a trigger (predetermined trigger) set in "trigger" in a cell (cell-to-be-monitored) set in "cell-to-be-monitored".

In the example shown in FIG. 8, the controller 23 controls the femto cell radio base station #c that manages the femto cell #c set in "cell-to-be-controlled" to activate the femto cell #c, i.e., to make the femto cell #c usable upon detecting that the number of mobile stations on standby has reached 1 or more (predetermined trigger) in the femto cell #a set in "cell-to-be-monitored".

In addition, the controller 23 controls the femto cell radio base station #c that manages the femto cell #c set in "cell-to-be-controlled" to deactivate the femto cell #c, i.e., to make the femto cell #c unusable upon detecting that the number of mobile stations on standby has reached 0 (predetermined trigger) in the femto cell #a set in "cell-to-be-monitored".

Additionally, the controller 23 may control the femto cell radio base station #c that manages the femto cell #c set in "cell-to-be-controlled" to activate the femto cell #c, i.e., to make the femto cell #c usable upon detecting that the number of mobile stations in process of establishing a radio connection has reached 1 or more (predetermined trigger) in the femto cell #a set in "cell-to-be-monitored".

Moreover, the controller 23 may control the femto cell radio base station #c that manages the femto cell #c set in "cell-to-be-controlled" to deactivate the femto cell #c, i.e., to make the femto cell #c unusable upon detecting that the number of mobile stations in process of establishing a radio connection has reached 0 (predetermined trigger) in the femto cell #a set in "cell-to-be-monitored".

MODIFIED EXAMPLE 1

A mobile communication system according to Modified Example 1 of the first and second embodiments described above may have a configuration shown in FIG. 9, to be more specific. The mobile communication system according to Modified Example 1 is a W-CDMA mobile communication system.

Figure 9:
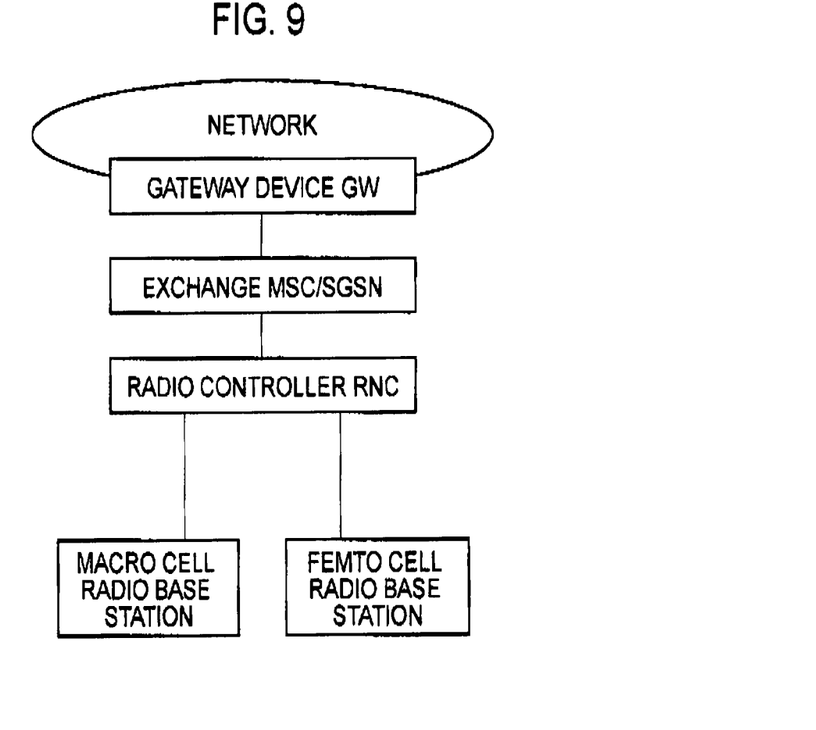
FIG. 9 is an overall configuration diagram of a mobile communication system according to Modified Example 1 of the present invention.

As shown in FIG. 9, in the mobile communication system according to Modified Example 1, a macro cell radio base station and a femto cell radio base station are housed in a radio controller RNC, the radio controller RNC is housed in an exchange MSC/SGSN, and the exchange MSC/SGSN is connected to a gateway device.

In the mobile communication system according to Modified Example 1, some of or all of the functions of the network device 10 shown in FIG. 2 may be mounted on devices such as the macro cell radio base station, the femto cell radio base station, the radio controller RNC, and the exchange MSC/SGSN.

Moreover, functions of a usable mobile station management server 1 may be mounted in one device or may be mounted separately in multiple devices.

MODIFIED EXAMPLE 2

A mobile communication system according to Modified Example 2 of the first and second embodiments described above may have a configuration shown in FIG. 10, to be more specific. The mobile communication system according to Modified Example 2 is an LTE mobile communication system.

Figure 10:
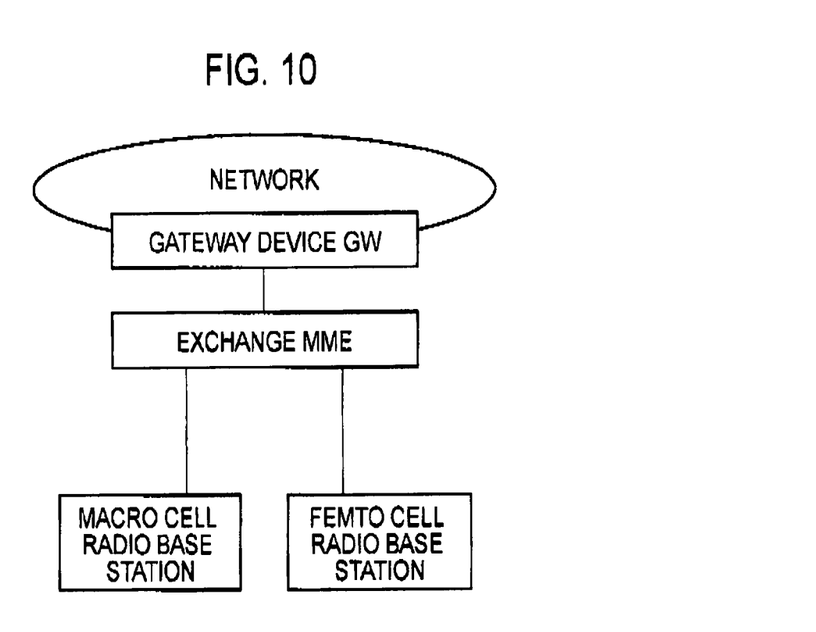
FIG. 10 is an overall configuration diagram of a mobile communication system according to Modified Example 2 of the present invention.

As shown in FIG. 10, in the mobile communication system according to Modified Example 2, a macro cell radio base station and a femto cell radio base station are housed in an exchange MME, the exchange MME is connected to a gateway device.

In the mobile communication system according to Modified Example 2, some of or all of the functions of the network device 10 shown in FIG. 2 may be mounted on devices such as the macro cell radio base station, the femto cell radio base station, the exchange MME.

Moreover, functions of a usable mobile station management server 1 may be mounted in one device or may be mounted separately in multiple devices.

MODIFIED EXAMPLE 3

A mobile communication system according to Modified Example 3 of the first and second embodiments described above may have a configuration shown in FIG. 11, to be more specific. The mobile communication system according to Modified Example 3 is a W-CDMA mobile communication system.

Figure 11:
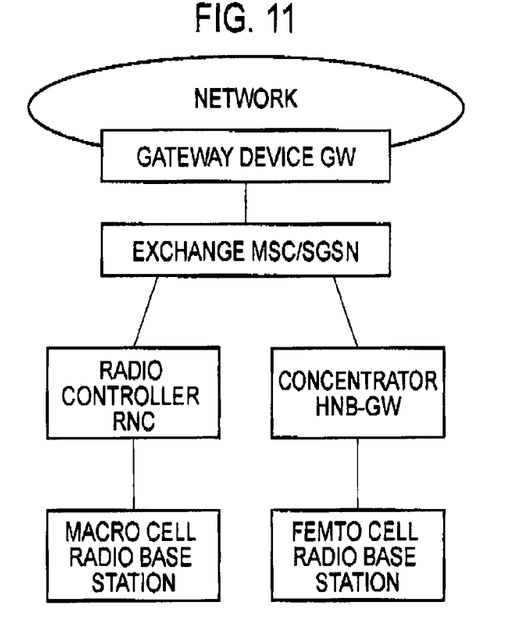
FIG. 11 is an overall configuration diagram of a mobile communication system according to Modified Example 3 of the present invention.

As shown in FIG. 11, in the mobile communication system according to Modified Example 3, a macro cell radio base station is housed in a radio controller RNC, a femto cell radio base station is housed in a concentrator HNB-GW, the radio controller RNC and the concentrator HNB-GW are housed in an exchange MSC/SGSN, and the exchange MSC/SGSN is connected to a gateway device.

In the mobile communication system according to Modified Example 3, some of or all of the functions of the network device 10 shown in FIG. 2 may be mounted on devices such as the macro cell radio base station, the femto cell radio base station, the radio controller RNC, the concentrator HNB-GW, and the exchange MSC/SGSN.

Moreover, functions of a usable mobile station management server 1 may be mounted in one device or may be mounted separately in multiple devices.

MODIFIED EXAMPLE 4

A mobile communication system according to Modified Example 4 of the first and second embodiments described above may have a configuration shown in FIG. 12, to be more specific. The mobile communication system according to Modified Example 4 is any of a W-CDMA mobile communication system and an LTE mobile communication system.

Figure 12:
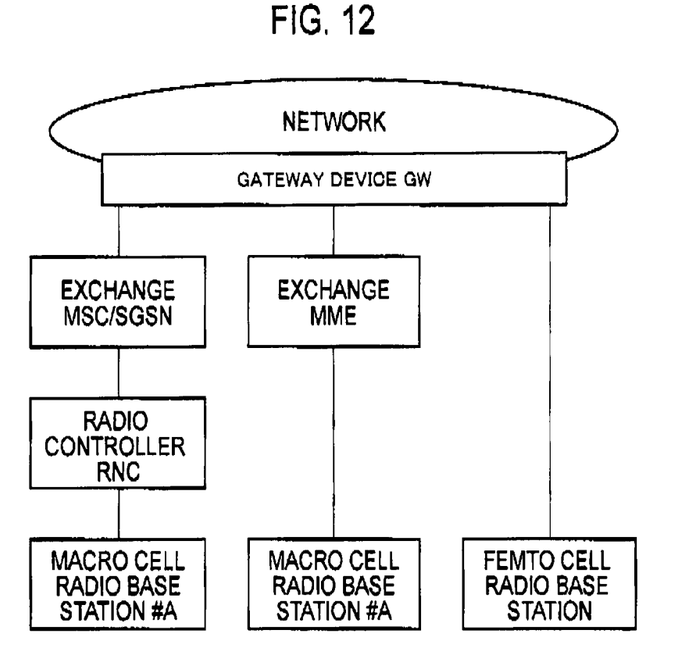
FIG. 12 is an overall configuration diagram of a mobile communication system according to Modified Example 4 of the present invention.

As shown in FIG. 12, in the mobile communication system according to Modified Example 4, a W-CDMA macro cell radio base station #A is housed in a radio controller RNC, an LTE macro cell radio base station #B is housed in an exchange MME, a femto cell radio base station is housed in a gateway device, the radio controller RNC is housed in an exchange MSC/SGSN, and the exchange MSC/SGSN and the exchange MME are connected to the gateway device.

In the mobile communication system according to Modified Example 4, some of or all of the functions of the network device 10 shown in FIG. 12 may be mounted on devices such as the macro cell radio base station #A/#B, the femto cell radio base station, the radio controller RNC, the exchange MME, the exchange MSC/SGSN, and the gateway device.

Moreover, functions of a usable mobile station management server 1 may be mounted in one device or may be mounted separately in multiple devices.

Note that operation of the above described mobile station UE, the radio base station (macro cell radio base station or femto cell radio base station) NodeB, eNB or the network device 10 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station (macro cell radio base station or femto cell radio base station) NodeB, eNB or the network device 10. Also, the storage medium and the processor may be provided in the mobile station UE, the radio base station (macro cell radio base station or femto cell radio base station) NodeB, eNB or the network device 10 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A network device comprising:
   a management unit configured to manage a cell-to-be-monitored and a cell-to-be-controlled in association with each other; and
   an instruction unit configured to give a predetermined instruction to a radio base station which manages the cell-to-be-controlled in association with the cell-to-be-monitored, upon detection of a predetermined trigger in the cell-to-be-monitored, wherein the predetermined trigger is detected when the number of mobile stations on standby, or in process of establishing a radio connection in the cell-to-be-monitored, exceeds a predetermined number, and the instruction unit instructs the radio base station to activate the cell-to-be-controlled, and wherein an area covered by the cell-to-be-controlled geographically differs from and does not overlap an area covered by the cell-to-be-monitored.

2. The network device according to claim 1, wherein a communication method or a frequency band used in the cell-to-be-monitored is different from a communication method or a frequency band used in the cell-to-be-controlled.

3. A radio base station comprising:
   a management unit configured to manage a cell-to-be-monitored and a cell-to-be-controlled in association with each other; and
   a controller configured to activate the cell-to-be-controlled which is managed in association with the cell-to-be-monitored, upon detection of a predetermined trigger in the cell-to-be-monitored, wherein the predetermined trigger is detected when the number of mobile stations on standby, or in process of establishing a radio connection in the cell-to-be-monitored, exceeds a first predetermined number, or
   the controller is configured to deactivate the cell-to-be-controlled upon detection of the predetermined trigger, wherein the predetermined trigger is detected in the cell-to-be-monitored, when the number of mobile stations on standby, or in process of establishing a radio connection in the cell-to-be-monitored falls below a second predetermined number, and wherein an area covered by the cell-to-be-controlled geographically differs from and does not overlap an area covered by the cell-to-be-monitored.

4. The radio base station according to claim 3, wherein a communication method or a frequency band used in the cell-to-be-monitored is different from a communication method or a frequency band used in the cell-to-be-controlled.

5. A network device comprising:
   a management unit configured to manage a cell-to-be-monitored and a cell-to-be-controlled in association with each other; and
   an instruction unit configured to give a predetermined instruction to a radio base station which manages the cell-to-be-controlled in association with the cell-to-be-monitored, upon detection of a predetermined trigger in the cell-to-be-monitored, wherein the predetermined trigger is detected in the cell-to-be-monitored, when the number of mobile stations on standby, or in process of establishing a radio connection in the cell-to-be-monitored, falls below a predetermined number, and instructs the radio base station to deactivate the cell-to-be-controlled, and wherein an area covered by the cell-to-be-controlled geographically differs from and does not overlap an area covered by the cell-to-be-monitored.

* * * * *